United States Patent [19]

McKay et al.

[11] Patent Number: 6,013,745
[45] Date of Patent: Jan. 11, 2000

[54] PHOSPHORUS BASED CATALYSTS FOR THE POLYMERIZATION OF OLEFINS

[75] Inventors: Ian McKay; Alison Ciupa; Arpad F. Somogyvari, all of Calgary; Beth Lorraine Creed, Airdrie; Alan Rodney Sanger, Edmonton; David John Law, Edmonton; Ronald George Cavell, Edmonton, all of Canada

[73] Assignee: The Governors of the University of Alberta, Edmonton, Canada

[21] Appl. No.: 08/905,650

[22] Filed: Aug. 4, 1997

[51] Int. Cl.[7] .................................................. C08F 4/44
[52] U.S. Cl. .......................... 526/132; 526/161; 526/172; 526/134; 526/169; 526/169.2; 502/155
[58] Field of Search .................... 526/161, 172, 526/132, 134, 169, 169.2; 502/155

[56] References Cited

U.S. PATENT DOCUMENTS

| | | | |
|---|---|---|---|
| 3,686,159 | 8/1972 | Bauer et al. | 526/171 |
| 4,537,982 | 8/1985 | Starzewski et al. | 556/22 |
| 4,716,205 | 12/1987 | Klabunde et al. | 526/115 |
| 5,334,791 | 8/1994 | Cavell et al. | 585/277 |
| 5,352,813 | 10/1994 | Cavell et al. | 556/21 |
| 5,468,702 | 11/1995 | Jejelowo et al. | 502/104 |
| 5,557,023 | 9/1996 | Somogyvari et al. | 585/513 |

OTHER PUBLICATIONS

Boor, Ziegler–Natta Catalysts and Polymerization, Academic Press, N.Y. (1979) pp. 602, 604–606, 1979.

*Primary Examiner*—David W. Wu
*Attorney, Agent, or Firm*—Kenneth H. Johnson

[57] ABSTRACT

The present invention relates to the polymerization of one or more alpha olefins in the presence of a transition metal catalyst having either a heterobifunctional ligand, having a phosphorus and a nitrogen atom, or a bis-phosphinimine ligand having two nitrogen atoms, in the presence of an activator.

24 Claims, No Drawings

PHOSPHORUS BASED CATALYSTS FOR THE POLYMERIZATION OF OLEFINS

FIELD OF THE INVENTION

The present invention relates to a process for the polymerization of one or more alpha olefins. The polymerization is carried out in the presence of a catalyst comprising a catalyst precursor consisting of complexes of Cr, V, Ti, Zr, and Hf with a heterobifunctional ligand having either a phosphine center and a phosphinimine center or two phosphinimine centers, and an activator.

BACKGROUND OF THE INVENTION

There are a number of patents and papers which disclose complexes containing phosphine centers and/or phosphinimine centers in the treatment of hydrocarbons. These publications generally relate to treatments of hydrocarbons such as oligomerization and reforming.

U.S. Pat. No. 5,334,791 issued Aug. 2, 1994 to Ligands, Inc. discloses that some complexes using ligands present in the catalyst of the present invention may be used to hydrogenate non-aromatic unsaturated hydrocarbons. U.S. Pat. No. 5,352,813 issued Oct. 4, 1994 to the University of Alberta discloses that some complexes using ligands present in the catalyst of the present invention may be used to carbonylate methanol. However, these patents do not disclose that such compounds in conjunction with an activator could be used to polymerize alpha olefins.

U.S. Pat. No. 5,557,023 issued Sep. 17, 1996 issued to The Governors of the University of Alberta teaches the use of transition metal complexes of the type in the present invention together with an activator to oligomerize ethylene. The patent does not suggest that such complexes could be used to polymerize olefins to polymers having a weight average molecular weight greater than 1500 g/mol.

Applicants have been unable to locate any disclosures teaching the use of the compounds of the present invention to polymerize olefins.

SUMMARY OF THE INVENTION

The present invention provides a process for the solution or slurry polymerization of one or more $C_{2-12}$ alpha olefins to a weight average molecular weight of at least 1500 in the presence of a catalyst comprising a complex of a transition metal selected from the group consisting of Cr, V, Ti, Zr, and Hf with a heterobifunctional ligand having a phosphine center and a phosphinimine center or two phosphinimine centers and one or more activators selected from the group consisting of activators of the formula $AlR_{3-n}X_n$ in which R is independently selected from the group consisting of a $C_{1-8}$ alkyl radical and a $C_{1-8}$ alkoxy radical, X is a halogen atom and n is 0, 1, or 2; aluminoxane compounds; anions (A$^-$) of the formula $[B(R^{18})_4]^-$ wherein each $R^{18}$ is independently selected from the group consisting of phenyl radicals which are unsubstituted or substituted by up to 5 substituents selected from the group consisting of a fluorine atom, a $C_{1-4}$ alkyl or alkoxy radical which is unsubstituted or substituted by a fluorine atom and a silyl radical of the formula —Si$(R^{19})_3$; wherein each $R^{19}$ is independently selected from the group consisting of a hydrogen atom and a $C_{1-4}$ alkyl radical and an activator of the formula $[B(R^{18})_3]$ wherein $R^{18}$ is as defined above to provide a mole ratio of aluminum to transition metal of at least 5:1 and to provide a molar ratio of transition metal to boron from 1:1 to 1:3, provided an aluminoxane activator is not used in conjunction with a boron activator; in a hydrocarbon selected from the group comprising $C_{4-12}$ aliphatic and aromatic compounds which are unsubstituted or substituted with a $C_{1-4}$ alkyl radical; at a temperature from 50° C. to 250° C.; and at a pressure from 15 to 4500 psi.

DETAILED DESCRIPTION

As used in this specification "the metal valence number" means the normal electrovalent oxidation state(s) of the metal (in the catalytic polymerization of olefins).

As used in this specification the term polymer means a number of monomers which have been joined together having a degree of polymerization of at least 50 (e.g. at least 50 monomers in the polymer) which will result in a weight average molecular weight (Mw) of 1500 or greater.

The catalyst precursor includes a source of a transition metal selected from the group consisting of Cr, V, Ti, Zr, and Hf and a heterobifunctional ligand having either a phosphine center and a phosphinimine center, or two phosphinimine centers.

The catalyst precursor having a heterobifunctional ligand having a phosphine center or an arsenic and an imine center has the general formula:

COMPLEX I

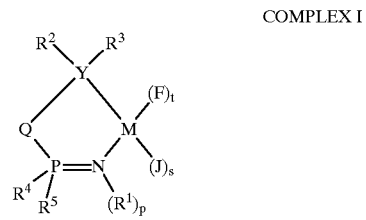

wherein: M, is a transition metal as defined above; $R^2$, $R^3$, $R^4$, and $R^5$ are independently selected from the group consisting of $C_{1-10}$ straight chained, branched or cyclic alkyl radicals; $C_{6-14}$ monoaromatic aryl radicals which are unsubstituted or substituted by up to three substituents, preferably one, selected from the group consisting of $C_{1-8}$ preferably $C_{1-4}$ alkyl radicals; F, and J are independently selected from the group consisting of Cl, Br, I, and H, and $C_{1-8}$ alkyl or aromatic ligands which are unsubstituted or substituted by one or more substituents selected from the group consisting of $C_{1-4}$ alkyl radicals, chlorine atoms and fluorine atoms; p, s and t can independently be 0, 1 and 2 provided t+s−p+1= the metal valence number, Y is P or As (preferably P), Q is selected from the group consisting of $(CH_2)_n$ wherein n is 1, 2, or 3; a $C_{2-4}$ alkyl radical; a disubstituted $C_6$ aryl radical; $R^6N$ wherein $R^6$ is selected from the group consisting of $C_{1-6}$ straight chained or branched alkyl radicals, and $C_{6-10}$ aryl radicals which are unsubstituted or substituted by a $C_{1-4}$ alkyl radical; if present $R^1$ is selected from the group consisting of a hydrogen atom, $C_{1-8}$ alkyl or aromatic radicals which are unsubstituted or substituted by a $C_{1-4}$ alkyl radical, and $SiR^9R^{10}R^{11}$ wherein $R^9$, $R^{10}$, and $R^{11}$ are independently selected from the group consisting of $C_{1-8}$ alkyl or aromatic radicals which is unsubstituted or substituted by one or more $C_{1-4}$ alkyl radicals.

In the above complexes the bond between the nitrogen atom and the metal may be a donor bond (i.e. M←N) when p is 1, or a covalent a bond when p is 0.

In the above complexes or compounds preferably M is Cr, Ti or Zr.

Suitable ligands include those of the formula $Ph_2PCH_2CH_2PPh_2=NSiMe_3$ (i.e. Y is P, Q is —$CH_2CH_2$—, p is 1 and $R^1$ is trimethyl silyl); and

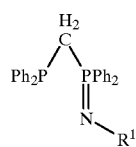

wherein p is 0 or 1, Q is CH$_2$ and if present R$^1$ is selected from the group as defined above.

Suitable ligands also include:

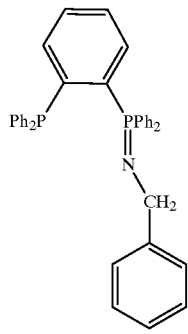

1-(N-benzyldiphenylphosphoranimine)-2-(diphenylphosphino)benzene (i.e. p is 1, Q is a disubstituted (divalent) phenyl radical, and R$^1$ is benzyl);

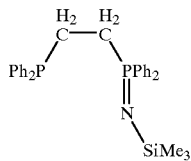

1-diphenylphosphino-2-(N-trimethylsilyidiphenylphosphoranimine)ethane (i.e. Q is —CH$_2$CH$_2$—, p is 1 and R$^1$ is trimethyl silyl);

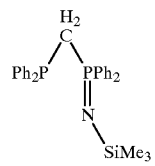

1-diphenylphosphino-1-(N-trimethylsilyldiphenylphosphanimine)methane (i.e. Q is —CH$_2$—, p is 1 and R$^1$ is trimethyl silyl).

In the above specific formulae R$^2$, R$^3$, R$^4$, and R$^5$ are all phenyl radicals.

The catalyst precursor may be of the formula:

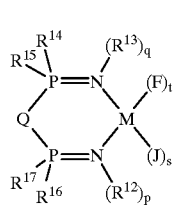

COMPLEX II wherein M, F, J and Q are as defined above; s and t may be 0, 1 or 2; and s+t−p−q+2=the valence of the metal for a metal complex; R$^{14}$ R$^{15}$, R$^{16}$, and R$^{17}$ are independently selected from the group consisting of C$_{1-10}$ straight chained, branched or cyclic alkyl radicals; C$_{6-14}$ monoaromatic aryl radicals which are unsubstituted or substituted by up to three substituents, preferably one, selected from the group consisting of C$_{1-8}$ preferably C$_{1-4}$ alkyl radicals; p and q independently are 0 or 1 and R$^{12}$ and R$^{13}$ if present are independently selected from the group consisting of a hydrogen atom, C$_{1-8}$ alkyl or aromatic radicals which are unsubstituted or substituted by a C$_{1-4}$ alkyl radical, and SiR$^9$R$^{10}$R$^{11}$ wherein R$^9$, R$^{10}$, and R$^{11}$ are independently selected from the group consisting C$_{1-8}$ alkyl or aromatic radicals which is unsubstituted or substituted by one or more C$_{1-4}$ alkyl radicals.

Some useful compounds of complex II include those wherein Q is —CH$_2$— or —CH$_2$—CH$_2$—, R$^{14}$, R$^{15}$, R$^{16}$, and R$^{17}$ are phenyl and p and q are independently 0 or 1, and if present R$^{12}$ and R$^{13}$ may be silyl radicals of the formula SiR$^9$R$^{10}$R$^{11}$ as defined above. In an other embodiment R$^{12}$ and R$^{13}$ if present may be benzyl radicals.

The catalyst precursor may be dissolved or dispersed in a hydrocarbon in which the co-catalyst and the alpha olefin are also soluble or which is miscible with the hydrocarbon in which the activator and alpha olefin are soluble or dispersible. Typically the hydrocarbon is a C$_{4-12}$ aliphatic or aromatic compound which is unsubstituted or substituted by one or more substituents selected from the group consisting of C$_{1-4}$ alkyl radicals. Suitable solvents include isobutane, hexane, toluene, gasoline, isopar, naphtha and decalin. Prior to use the hydrocarbon should be treated to remove any dissolved oxygen, or water compounds which tend to poison the Ziegler-Natta type catalysts. Such procedures are well known to those skilled in the art.

The present invention also includes ion pairs in which a complex of formula I or II has a substituent removed from it and the resulting species is stabilized with a counter balancing species such as those selected from the group consisting of:

(i) anions (A$^−$) of the formula [B(R$^{18}$)$_4$]$^−$ wherein each R$^{18}$ is independently selected from the group consisting of phenyl radicals which are unsubstituted or substituted by up to 5 substituents selected from the group consisting of a fluorine atom, a C$_{1-4}$ alkyl or alkoxy radical which is unsubstituted or substituted by a fluorine atom and a silyl radical of the formula —Si(R$^{19}$)$_3$; wherein each R$^{19}$ is independently selected from the group consisting of a hydrogen atom and a C$_{1-4}$ alkyl radical; and (ii) an activator of the formula [B(R$^{18}$)$_3$] wherein R$^{18}$ is as defined above.

Without wishing to be bound by theory it is believed that the activator of the formula [B(R$^{18}$)$_3$] interacts with F or J in the complexes of formula I and II to activate the resulting complex.

The resulting complexes are those of complex III:

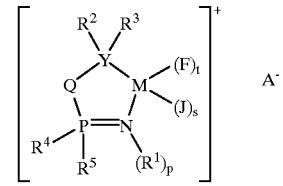

Complex III wherein M, Q, Y, F, J, R$^1$, R$^2$, R$^3$, R$^4$, R$^5$, p, s and t are as defined above and s+t−p+2=the metal valence number, A$^−$ is an anion of the formula [B(R$^{18}$)$_4$]$^-$ wherein each R$^{18}$ is independently selected from the group consisting of phenyl radicals which are unsubstituted or substituted by up to 5 substituents selected from the group consisting of a fluorine atom, a C$_{1-4}$ alkyl or alkoxy radical which is unsubstituted or substituted by a fluorine atom and a silyl radical of the formula —Si(R$^{19}$)$_3$; wherein each R$^{19}$ is independently selected from the group consisting of a hydrogen atom and a C$_{1-4}$ alkyl radical; and an adduct of complex I, as defined above, with an activator of the formula [B(R$^{18}$)$_3$] wherein R$^{18}$ is as defined above.

In the case of complexes of type II (COMPLEX II) the counter balancing species may be an anion of the form as defined above (e.g. A$^-$) in which case the complex is of the formula:

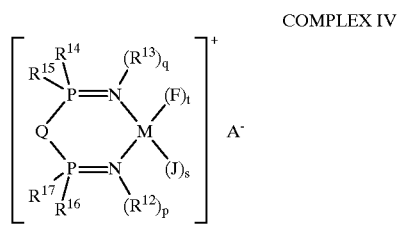

COMPLEX IV wherein M, Q, Y, F, J, R$^{12}$, R$^{13}$, R$^{14}$, R$^{15}$, R$^{16}$, p, q; s, t and A$^-$ are as defined above provided that s+t−p−q+3=the metal valence number or an adduct of complex II, as defined above, with an activator of the formula [B(R$^{18}$)$_3$] wherein R$^{18}$ is as defined above.

Generally the boron based activators are used to provide a molar ratio of transition metal to boron from 1:1 to 1:3.

Alternatively an activator for the catalyst may be an aluminum alkyl compound such as are used in Ziegler-Natta catalysts. Such activators may be selected from the group of activators consisting of:

(i) activators of the formula AlR$_{3-n}$X$_n$ wherein R is a C$_{1-8}$, preferably C$_{1-4}$, alkyl radical, most preferably an ethyl radical, X is halogen, preferably chlorine, and n is 0, 1 or 2; and (ii) aluminoxane compounds of the formula R$^{20}_2$AlO (R$^{20}$AlO)$_m$AlR$^{20}_2$ wherein each R$^{20}$ is independently selected from the group consisting of C$_{1-20}$ hydrocarbyl radicals such as alkyl, cycloalkyl, aryl, alkyl substituted cycloalkyl or aryl, preferably C$_{1-4}$ alkyl, most preferably methyl, and m is from 0 to about 50, preferably from 5 to 30.

Commercially available activators include diethyl aluminum chloride (DEAC), ethyl aluminum dichloride (EADC), and methyl aluminoxane (MAO).

In some instances it is desirable to include aluminum activator compounds in an excess, preferably small, to act as scavengers for species which may poison the catalyst.

The boron activators may be used in conjunction with aluminum activators in which case it is believed that the aluminum activator acts as a reducing agent for the transition metal. Care should be used when mixing activators. The effect of combinations of different activators on the process may be determined by one of ordinary skill in the art using routine non-inventive testing in view of the present specification.

The mole ratio of aluminum in the activator to transition metal may be at least 5:1. For aluminum alkyl or alkoxyalkyl aluminum activators the preferred molar ratio of aluminum to transition metal is from 10:1 to 200:1. For aluminoxanes the preferred molar ratio of aluminum to transition metal is from 100:1 to 1500:1.

The olefin may be one or more alpha olefins selected from the group consisting of C$_{2-12}$ olefins. Some useful olefins include ethylene, propylene, butylene, hexene and octene.

The solution or dispersion of catalyst precursor, activator and olefin are then reacted in a pressurized vessel (a Parr bomb, autoclave or a reactor (CSTR)) at a temperature from 50° C. to 250° C., preferably from 70 to 200° C. The pressure in the reactor may be from 15 to 4500 psi. If the pressure and temperature are such to maintain the olefin in a liquid form then the olefin need not be dissolved in a solvent.

The residence time in the reactor may be up to several hours. The reacting system may be a solution or a slurry. On exiting the reactor the liquid phase may be subjected to conventional separation techniques.

The invention will be illustrated by the following non-limiting examples.

Catalyst Precursors

All of the syntheses described below were carried out under an inert argon atmosphere and all of the solvents were dried over molecular sieves and degassed prior to use.

Chromium Catalyst—01 (A): CrCl$_3$.3THF (1 g, 2.67 mmol) and bis-(N-trimethylsilyldiphenylphosphiniminyl)methane (TNPCPNT i.e. complex II in which Q is —CH$_2$—; R$^{14}$, R$^{15}$, R$^{16}$, and R$^{17}$ are phenyl; and if p and q are 1 then R$^{12}$ and R$^{13}$ are trimethylsilyl) (1.5 g, 2.68 mmol) were dissolved in 50 mL of dichloromethane under argon and the mixture refluxed for 12 hours. On cooling the solvent was removed and the resultant purple residue was treated with boiling hexane and filtered hot. The gray powdery product was dried under vacuum. Yield: 1.9 g.

Chromium Catalyst—02 (B): CrCl$_3$.3THF (1g, 2.67 mmol) and diphenylphosphino-(N-trimethylsilydiphenylphosphiniminyl)methane (PCPNT i.e. complex I in which Q is —CH$_2$—; R$^2$, R$^3$, R$^4$, and R$^5$ are phenyl and if p is 1 then R$^1$ is trimethylsilyl) (1.26 g, 2.67 mmol) were dissolved in 50 mL of dichloromethane. Zinc powder (0.17 g) was added to the solution and the mixture was refluxed under argon for 12 hours. On cooling the solution was filtered to remove the zinc and the solvent was removed under reduced pressure. The resulting residue was then treated with boiling hexane and filtered hot yielding a gray powdery product which was dried under vacuum. Yield: 1.7 g.

Chromium Catalyst—03 (C): CrCl$_3$.3THF (1.506 g, 4.02 mmol), PCPNT (1.895 g, 4.02 mmol) and zinc powder (0.18 g) were suspended in THF (50 mL) and the mixture stirred under argon for 18 hours. The solution was then filtered and the solvent was removed to yield the product as a microcrystalline green solid. Yield: 2.2 g.

Chromium Catalyst—04 (D): CrCl$_3$.3THF (1.871 g, 4.99 mmol), TNPCPNT (2.79 g, 4.99 mmol) and zinc powder (0.18 g) were stirred in THF (50 mL) under argon for 18 hours. The solution was then filtered and the solvent was removed under reduced pressure to yield the product as a green solid. Yield: 3.05 g.

Chromium Catalyst—05 (E): CrCl$_3$.3THF (1.046 g) and dichloromethane (50 mL) were refluxed to dissolve the metal complex. TNPCPNT (1.560 g dissolved in 50 mL dichloromethane) was added via dropping funnel and the mixture was refluxed under argon for approximately 3 hours. The solvent was removed and the resulting purple product was dried under vacuum. Yield: 1.5 g.

Titanium Catalyst—01 (F): Ti based catalyst as described in U.S. Pat. No. 4,302,566 to Karol et al. issued Nov. 24, 1981 and assigned to Union Carbide Corporation.

Titanium Catalyst—02 (G): TiCl$_4$ (0.27 g) and diethyl ether (30 mL) were stirred at ambient temperature. TNPCPNT (1.05 g dissolved in 10 mL diethyl ether) was slowly added and the resulting mixture was stirred at ambient temperature for 18 hours. The solvent was removed and the resulting yellow precipitate was dried under vacuum. Yield: 0.80 g.
Titanium Catalyst—03 (H): $TiCl_3$ (0.62 g) and 100 mL of a 2:1 dichloromethane/THF solution were refluxed to dissolve the $TiCl_3$. TNPCPNT (2.254 g dissolved in 50 mL of THF) was added via dropping funnel and the mixture was refluxed for 4 hours. The solvent was removed and the resulting black precipitate was dried under vacuum. Yield: 1.68 g.
Zirconium Catalyst—01 (I): $ZrCl_4$ (0.40 g) and THF (30 mL) were stirred at ambient temperature. TNPCPNT (0.97 g dissolved in 20 mL THF) was added via dropping funnel. The solution was stirred at ambient temperature for 18 hours. The solvent was removed and the resulting orange/yellow crystalline product was dried under vacuum.
Hafnium Catalyst—01(J): $HfCl_4.2THF$ (1.404 g) and 50 mL of THF were refluxed to dissolve the metal complex. TNPCPNT (1.689 g dissolved in 50 mL of THF) was added via dropping funnel and the mixture was refluxed for 4 hours. The solution was cooled and then placed in a freezer for 3 days. The solvent was transferred via cannula to a second flask and the resulting white powder was dried under vacuum. Hexane (50 mL) was added to the second flask and placed in the freezer for 18 hours. The hexane was removed and the remaining product was dried under vacuum. Catalyst recovered from both flasks was added together.
Zirconium Catalyst—02 (K): $ZrCl_4$ (0.50 g, 2.14 mmol) and $NaBPh_4$ (0.73 g, 2.14 mmol) were stirred in THF (30 mL) under argon for 1 hour. The ligand, TNPCPNT (1.2 g, 2.14 mmol), was then added to the mixture and the mixture was stirred under reflux for 8 hours. The reaction mixture was cooled, filtered and the solvent was removed from the filtrate in vacuo to yield the product as an orange brown solid (1.5 g, 81%). Recrystallization from acetonitrile yielded the complex $[ZrCl(N=PPh_2CH_2PPh_2=N)(CH_3CN)_2]^+$ $[BPh_4]^-$.

EXAMPLES

Examples 1–4

Initial screening runs of several of the chromium catalysts were performed initially at room temperature and pressure using standard Schlenk vessels and techniques and a one atmosphere gas line apparatus. The catalyst precursor (0.1 g) was stirred as a suspension in toluene (30 cm$^3$). After equilibration with ethylene at one atmosphere pressure the co-catalyst was added. A color change from purple or green to orange was noted for examples 1 and 2 (examples 3 and 4 showed no color change) and ethylene uptake was immediately observed along with considerable warming of the reaction mixture. The results are tabulated in table 1.

TABLE 1

| Example | Catalyst Precursor (mmol) | Activator (mmol/equivs) | Temp (° C.) | Ethylene Pressure (bar) | Activity (gPE/ mmol.h.b) |
|---|---|---|---|---|---|
| 1 | C (0.13) (purple isomer) | DEAC (9.00/65) | 23 | 1 | 1.83 |
| 2 | C (0.13) (purple isomer) | DEAC (9.00/65) | 0 | 1 | 0 |
| 3 | D (0.13) | DEAC (9.00/65) | 23 | 1 | ≦0.5 |

TABLE 1-continued

| Example | Catalyst Precursor (mmol) | Activator (mmol/equivs) | Temp (° C.) | Ethylene Pressure (bar) | Activity (gPE/ mmol.h.b) |
|---|---|---|---|---|---|
| 4 | C (0.13) (green isomer) | DEAC (9.00/65) | 23 | 1 | 0.17 |

Most of the polymerization tests were conducted in glass vessels at intermediate pressures. All solvents were dried over molecular sieves and degassed with argon. The glass vessels utilized for polymerization were 200 mL, heavy-walled, soda bottles sealed with a Teflon layer, then a nitrile rubber septum held in place by a crimped aluminum bottle cap. Ethylene partial pressures in the vapor phase over the solutions have been calculated using the Peng-Robinson equation of state.

Example 5

100 mg of Catalyst A was introduced into a 200 mL glass vessel and thereafter 100 mL of toluene was added to the glass vessel. The mixture was then heated to 70° C. while being degassed with ethylene. 1 mL of a 25 weight percent solution of diethyl aluminum chloride (DEAC) in hexane was added to the mixture. Ethylene pressure was then increased to 25 psig and polymerization was conducted for 65 minutes. Polymerization data and results are presented in Table 2.

Example 6

100 mg of Catalyst B was employed in a polymerization with an identical recipe and procedure to that employed in example 5, except that the polymerization time was 35 minutes. Polymerization data and results are presented in Table 2.

Example 7

30 mg of Catalyst C was introduced into a 200 mL glass vessel and thereafter 100 mL of hexane was added to the glass vessel. The mixture was then heated to 70° C. while being degassed with ethylene. 2.3 mL of a 25 weight percent solution of diethyl aluminum chloride (DEAC) in hexane was added to the mixture. Ethylene pressure was then increased to 25 psig and polymerization was conducted for 110 minutes. Polymerization data and results are presented in Table 2.

Example 8

100 mg of Catalyst D was introduced into a 200 mL glass vessel and thereafter 100 mL of toluene was added to the glass vessel. The mixture was then heated to 70° C. while being degassed with ethylene. 8.2 mL of a 25 weight percent solution of diethyl aluminum chloride (DEAC) in hexane was added to the mixture. Ethylene pressure was then increased to 25 psig and polymerization was conducted for 133 minutes. Polymerization data and results are presented in Table 2.

Example 9

250 mg of Catalyst F was introduced into a 200 mL glass vessel and thereafter 100 mL of hexane was added to the glass vessel. The mixture was then heated to 80° C. while being degassed with ethylene. 1.2 mL of a 25 weight percent solution of triethyl aluminum (TEAL) in hexane was added to the mixture. Ethylene pressure was then increased to 25 psig and polymerization was conducted for 110 minutes. Polymerization data and results are presented in Table 2.

TABLE 2

| Ex. | Catalyst Precursor (mmol) | Activator (mmol/ equivs) | Temp (° C.) | Ethylene Pressure (bar) | Time (min) | Activity (gPE/ mmol.h.b) |
|---|---|---|---|---|---|---|
| 5 | A (0.1398) | DEAC (1.48/10.6) | 70 | 2.4 | 65 | 7.3 |
| 6 | B (0.1504) | DEAC (1.48/9.9) | 70 | 2.4 | 35 | 4.2 |
| 7 | C (0.0419) | DEAC (3.41/81.3) | 70 | 1.7 | 110 | 1.6 |
| 8 | D (0.1504) | DEAC (12.16/80.8) | 70 | 2.4 | 133 | 1.0 |
| 9 | F (0.0465) | TEAL (1.83/39.4) | 80 | 1.3 | 120 | 67.0 |

Examples 10–17

In each of these examples 50 mg of Catalyst A was placed in a 200 mL glass vessel followed by 100 mL of toluene. In the examples employing hexene as comonomer, 6.0 mL of hexene was added into the glass vessel (Table 3). The mixture was heated to the reaction temperature (Table 3) while being degassed with ethylene. 1.0 mL of a 25 weight percent solution of diethyl aluminium chloride (DEAC) in hexane was added to the mixture. In the examples employing hydrogen, 55 standard cubic centimeters (scc) of hydrogen was added into the glass vessel by means of an integrating gas mass flow indicating controller (Table 3). Ethylene pressure was then increased to 25 psig and polymerization was conducted for 60 minutes. Polymerization and results are presented in Table 4.

TABLE 3

| Example | Reaction Temperature (° C.) | Hexene (mL) | Hydrogen (scc) |
|---|---|---|---|
| 10 | 90 | 0 | 55 |
| 11 | 90 | 0 | 0 |
| 12 | 60 | 0 | 0 |
| 13 | 60 | 0 | 55 |
| 14 | 60 | 6 | 0 |
| 15 | 90 | 6 | 0 |
| 16 | 60 | 6 | 55 |
| 17 | 90 | 6 | 55 |

TABLE 4

| Example | Catalyst Precursor (mmol) | Activator (mmol/ equivs) | Temp (° C.) | Ethylene Pressure (bar) | Time (min) | Activity (gPE/ mmol.h.b) |
|---|---|---|---|---|---|---|
| 10 | A (0.0699) | DEAC (1.48/21.2) | 90 | 1.4 | 60 | 4.0 |
| 11 | A (0.0699) | DEAC (1.48/21.2) | 90 | 2.2 | 60 | 5.9 |
| 12 | A (0.0699) | DEAC (1.48/21.2) | 60 | 2.5 | 60 | 5.1 |
| 13 | A (0.0699) | DEAC (1.48/21.2) | 60 | 1.9 | 60 | 1.5 |
| 14 | A (0.0699) | DEAC (1.48/21.2) | 60 | 2.5 | 60 | 1.7 |
| 15 | A (0.0699) | DEAC (1.48/21.2) | 90 | 2.1 | 60 | 2.1 |
| 16 | A (0.0699) | DEAC (1.48/21.2) | 60 | 1.8 | 60 | 2.4 |
| 17 | A (0.0699) | DEAC (1.48/21.2) | 90 | 1.3 | 60 | 2.2 |

Examples 18–27

In each of these examples 50 mg of Catalyst (Table 5) was placed in a 200 mL glass vessel followed by 100 mL of toluene. The mixture was heated to 80° C. while being degassed with ethylene. The desired amount of activator solution (Table 4) was added to the mixture. Ethylene pressure was then increased to 30 psig and polymerization was conducted for 120 minutes. Polymerization data and results are presented in Table 5.

TABLE 5

| Example | Catalyst Precursor (mmol) | Activator (mmol/ equivs) | Temp (° C.) | Ethylene Pressure (bar) | Time (min) | Activity (gPE/ mmol.h.b) |
|---|---|---|---|---|---|---|
| 18 | E (0.0698) | DEAC (6.97/99.8) | 80 | 2.7 | 120 | 3.2 |
| 19 | G (0.0941) | MAO (94.1/999.5) | 80 | 2.7 | 120 | 11.0 |
| 20 | H (0.1009) | MAO (100.8/999.3) | 80 | 2.7 | 120 | 10.9 |
| 21 | I (0.0631) | MAO (87.0/1378) | 80 | 2.7 | 120 | 18.9 |
| 22 | E (0.0698) | MAO (69.8/999.7) | 80 | 2.7 | 120 | 11.4 |
| 23 | G (0.0941) | TEAL (9.45/100.4) | 80 | 2.7 | 120 | 1.1 |
| 24 | H (0.1009) | TEAL (10.46/103.7) | 80 | 2.7 | 120 | 1.0 |
| 25 | I (0.0631) | TEAL (9.38/148.6) | 80 | 2.7 | 120 | 1.5 |
| 26 | E (0.0698) | TEAL (7.85/112.5) | 80 | 2.7 | 120 | 1.1 |
| 27 | J (0.0756) | MAO (75.6/1000.6) | 80 | 2.7 | 120 | 10.3 |

Example 28

300 mL of dry, degassed toluene and 1.92 g of a 25 wt % solution of triethylaluminum (TEAL) in toluene were introduced into a 1 L, stainless steel, autoclave reactor. The reactor was then heated to 103° C. Ethylene was then introduced to bring the reactor pressure to 550 psig. The final portion of this initial ethylene charge was used to introduce 104 mg of Catalyst K into the reactor. Ethylene was thereafter fed on demand to the reactor to maintain a steady pressure of 550 psig during the 30 minute polymerization run. Polymerization data and results are presented in Table 6.

TABLE 6

| Example | Catalyst Precursor (mmol) | Activator (mmol/ equivs) | Temp (° C.) | Ethylene Pressure (bar) | Time (min) | Activity (gPE/ mmol.h.b) |
|---|---|---|---|---|---|---|
| 28 | K (0.1105) | TEAL (3.92/35.58) | 103 | 37.4 | 30 | 0.43 |

What is claimed is:

1. A process for the solution or slurry polymerization of one or more $C_{2-12}$ alpha olefins to a weight average molecular weight of at least 1500 in the presence of a catalyst selected from the group consisting of:

(i) complexes of formula (II)

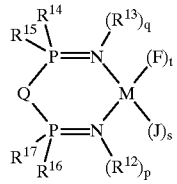

wherein: M is a transition metal selected from the group consisting of Cr, V, Ti, Zr and Hf; F and J are independently selected from the group consisting of Cl, Br, I and H, and $C_{1-8}$ alkyl or aromatic ligands which are unsubstituted or substituted by one or more substituents selected from the group consisting of $C_{1-4}$ alkyl radicals, chlorine atoms, and fluorine atoms; Q is selected from the group consisting of $(CH_2)_n$ wherein n is 1, 2 or 3; a $C_{2-4}$ alkyl radical; a disubstituted $C_6$ aryl radical; $R^6N$ wherein $R^6$ is selected from the group consisting of $C_{1-6}$ straight chained or branched alkyl radicals, $C_{6-10}$ aryl radicals which are unsubstituted or substituted by a $C_{1-4}$ alkyl radical; s and t are 0, 1 or 2 and p and q independently are 0 or 1 provided s+t–p–q+2=the valence of the metal; $R^{14}$,$R^{15}$, $R^{16}$ and $R^{17}$ are independently selected from the group consisting of $C_{1-10}$ straight chained, branched or cyclic alkyl radicals; $C_{6-14}$ monoaromatic aryl radicals which are unsubstituted or substituted by up to three substituents selected from the group consisting of $C_{1-8}$ alkyl radicals; $R^{12}$ and $R^{13}$, if present, are independently selected from the group consisting of a hydrogen atom, $C_{1-8}$ alkyl or aromatic radicals which are unsubstituted or substituted by a $C_{1-4}$ alkyl radical, and a radical of the formula $SiR^9R^{10}R^{11}$ wherein $R^9$, $R^{10}$ and $R^{11}$ are independently selected from the group consisting of $C_{1-8}$ alkyl or aromatic radicals which is unsubstituted or substituted by one or more $C_{1-4}$ alkyl radicals;

and one or more activators selected from the group consisting of activators of the formula $AlR_{3-n} X_n$ in which R is independently selected from the group consisting of a $C_{1-8}$ alkyl radical and a $C_{1-8}$ alkoxy radical, X is a halogen atom and n is 0, 1 or 2; and aluminoxane compounds;

(ii) complexes of formula (IV)

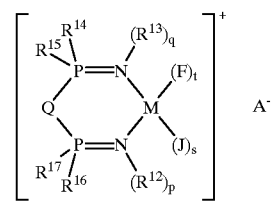

wherein M, Q, F, J, $R^{12}$, $R^{13}$, $R^{14}$, $R^{15}$, $R^{16}$, $R^{17}$, p, q, s, and t are as defined above;

and $A^-$ is an anion selected from the group consisting of anions of the formula $[B(R^{18})_4]^-$ wherein each $R^{18}$ is independently selected from the group consisting of phenyl radicals which are unsubstituted or substituted with up to 5 substituents selected from the group consisting of a fluorine atom, a $C_{1-4}$ alkyl or alkoxy radical which is unsubstituted or substituted by a fluorine atom and a silyl radical of the formula $—Si—(R^{19})_3$; wherein each $R^{19}$ is independently selected from the group consisting of a hydrogen atom and a $C_{1-4}$ alkyl radical, provided s+t–p–q+3=the metal valence number;

and optionally an activator of the formula $AlR_{3-n} X_n$ in which R is independently selected from the group consisting of a $C_{1-8}$ alkyl radical and a $C_{1-8}$ alkoxy radical, X is a halogen atom and n is 0, 1 or 2; and (iii) an adduct of complex II, as defined above, with an activator of the formula $[B(R^{18})_3]$ wherein $R^{18}$ is as defined above;

and optionally an activator of the formula $AlR_{3-n} X_n$ in which R is independently selected from the group consisting of a $C_{1-8}$ alkyl radical and a $C_{1-8}$ alkoxy radical, X is a halogen atom and n is 0, 1 or 2 wherein the mole ratio of aluminum to transition metal of at least 5:1 and molar ratio of transition metal to boron from 1:1 to 1:3; in a hydrocarbon selected from the group comprising $C_{4-12}$ aliphatic and aromatic compounds which are unsubstituted or substituted with a $C_{1-4}$ alkyl radical; at a temperature from 50° C. to 250° C.; and at a pressure from 15 to 4500 psi.

2. The process according to claim 1, wherein said one or more olefins are selected from the group consisting of ethylene, propylene, butylene, hexene and octene.

3. The process according to claim 2, wherein the hydrocarbon is selected from the group consisting of isobutane, hexane, toluene, gasoline, isopar, naphtha and decalin.

4. The process according to claim 3, wherein the activator is selected from the group consisting of triethyl aluminum, diethyl aluminum chloride, ethyl aluminum dichloride.

5. The process according to claim 4, wherein the mole ratio of aluminum to transition metal in the catalyst is from 5:1 to 200:1.

6. The process according to claim 3, wherein the activator is an aluminoxane of the formula $R^{20}_2AlO(R^{20}AlO)_mAlR^{20}_2$ wherein each $R^{20}$ is independently selected from the group consisting of a $C_{1-20}$ hydrocarbyl radical and m is from 5 to 30.

7. The process according to claim 6, wherein the mole ratio of aluminum to transition metal in the catalyst is from 100:1 to 1500:1.

8. The process according to claim 7, wherein in said aluminoxane $R^{20}$ is selected from the group consisting of $C_{1-4}$ straight chained or branched alkyl radicals.

9. The process according to claim 5, wherein the transition metal complex has the formula II.

10. The process according to claim 8, wherein the transition metal complex has the formula II.

11. The process according to claim 9, wherein Q is $CH_2$.

12. The process according to claim 10, wherein Q is $CH_2$.

13. The process according to claim 9, wherein Q is $CH_2CH_2$.

14. The process according to claim 10, wherein Q is $CH_2CH_2$.

15. The process according to claim 9, wherein Q is a disubstituted phenyl radical, and $R^{12}$ and $R^{13}$ are benzyl radicals.

16. The process according to claim 10, wherein Q is a disubstituted phenyl radical, and $R^{12}$ and $R^{13}$ are benzyl radicals.

17. The process according to claim 3, wherein the transition metal complex has the formula II.

18. The process according to claim 17 wherein the activator further includes an aluminum activator.

19. The process according to claim 3, wherein the transition metal complex has the formula IV.

20. The process according to claim 19 wherein the activator further includes an aluminum activator.

21. The process according to claim 3 wherein the transition metal complex has the formula $[ZrCl(N=PPh_2CH_2PPh_2=N)(CH_3CN)_2]^+[BPh_4]^-$.

22. The process according to claim 21 where in the activator further includes triethyl aluminum.

23. The process according to claim 9 wherein Q is $-CH_2-$; $R^{14}$, $R^{15}$, $R^{16}$, and $R^{17}$ are phenyl; and if p and q are 1 then $R^{12}$ and $R^{13}$ are trimethylsilyl.

24. The process according to claim 10 wherein Q is $-CH_2-$; $R^{14}$, $R^{15}$, $R^{16}$, and $R^{17}$ are phenyl; and if p and q are 1 then $R^{12}$ and $R^{13}$ are trimethylsilyl.

* * * * *